United States Patent
Bellam et al.

(10) Patent No.: US 10,375,563 B1
(45) Date of Patent: Aug. 6, 2019

(54) SYSTEMS AND METHODS FOR WEB-BASED COMMUNICATIONS CONSOLIDATION

(71) Applicant: T-Mobile USA, Inc., Bellevue, WA (US)

(72) Inventors: Prakasa Bellam, Snohomish, WA (US); Gurpreet Singh, Renton, WA (US); Frederick Andrew Lien, Bellevue, WA (US); Nitin Kumar, Bothell, WA (US); Taylor Edwards, Redmond, WA (US); Mikhail Fridman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/946,490

(22) Filed: Apr. 5, 2018

(51) Int. Cl.
*H04W 8/04* (2009.01)
*H04W 12/06* (2009.01)

(52) U.S. Cl.
CPC ............. *H04W 8/04* (2013.01); *H04W 12/06* (2013.01)

(58) Field of Classification Search
CPC ................................ H04W 8/04; H04W 12/06
USPC ...................................................... 455/435.1
See application file for complete search history.

(56) References Cited

U.S. PATENT DOCUMENTS

| | | | | |
|---|---|---|---|---|
| 2006/0218291 | A1* | 9/2006 | Zhu | H04L 65/1069 709/229 |
| 2010/0312897 | A1* | 12/2010 | Allen | H04L 12/1822 709/227 |
| 2016/0135023 | A1* | 5/2016 | Schmit | H04W 4/16 455/417 |

* cited by examiner

*Primary Examiner* — Anthony S Addy
*Assistant Examiner* — Farid Seyedvosoghi
(74) *Attorney, Agent, or Firm* — Lee & Hayes, P.C.

(57) ABSTRACT

Systems and methods for providing online access to multiple mobile station international subscriber directory numbers (MSISDNs), or mobile numbers, with compatible internet-connected user equipment (UEs). The system can include a web portal through which users can send and receive voice calls, video calls, text messages, e-mails, and other communications via multiple authorized mobile numbers. The system can include a graphical user interface (GUI) to enable users to select a mobile number to place a call or send a text, for example, with the call or text appearing to be sent from the mobile number. The system can also route incoming calls and texts to both the UE associated with the mobile number and the web portal. Thus, an incoming call, for example, can ring on both the UE and a tablet or laptop computer substantially simultaneously.

5 Claims, 10 Drawing Sheets

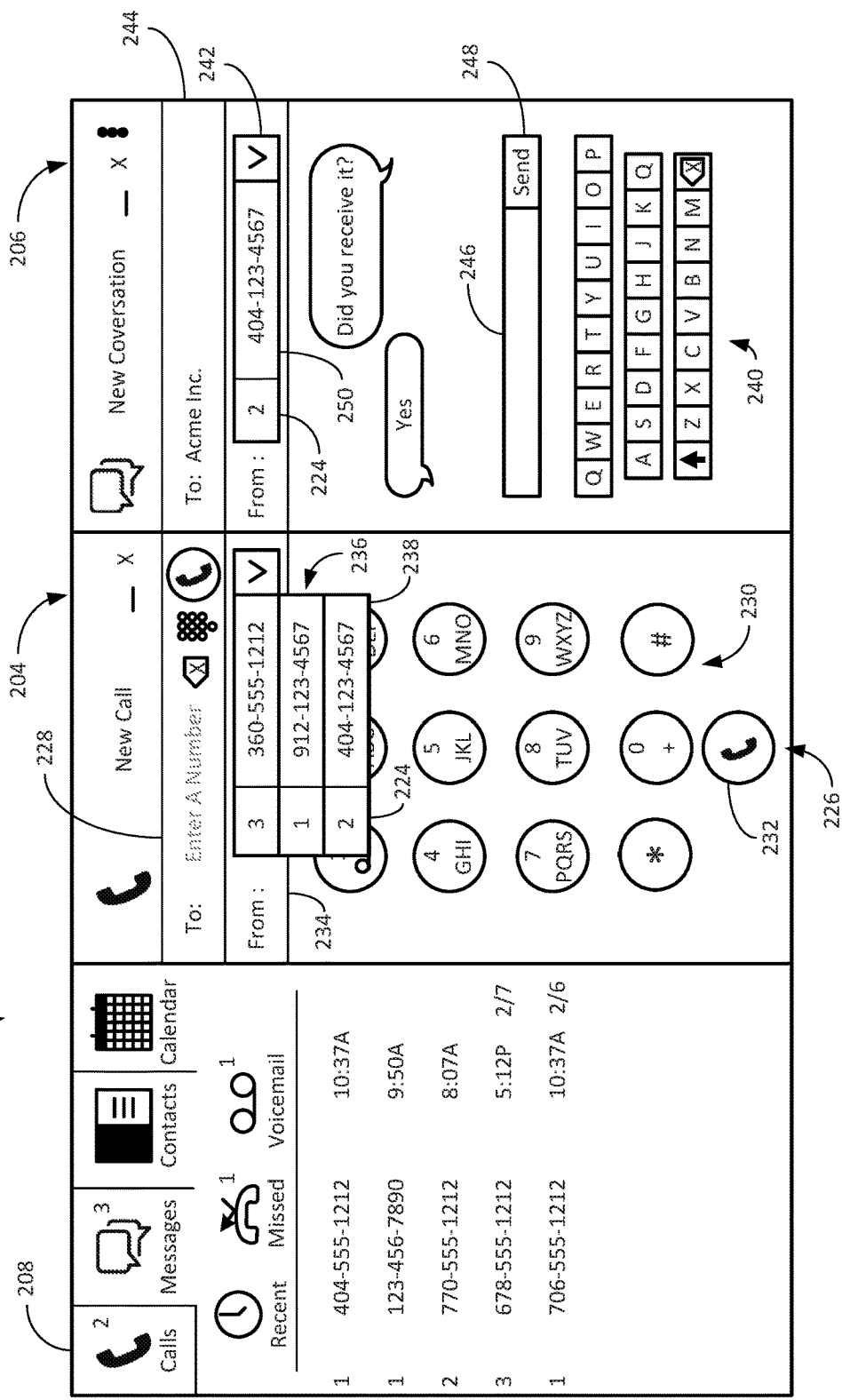

SYSTEMS AND METHODS FOR WEB-BASED COMMUNICATIONS CONSOLIDATION

BACKGROUND

Many people communicate using multiple devices, phone numbers, and e-mail addresses, among other things. People may have a work phone, a work cell phone, and a personal cell phone. Similarly, people have personal e-mail addresses, work e-mail addresses, personal calendars, work calendars, etc. This means that the user may have to carry multiple devices—e.g., the work cell phone and the personal cell phone—and at the very least, may have to check multiple applications or locations to manage their communications and scheduling.

Currently a cellular phone number, or mobile station international subscriber directory number (MSISDN), is generally only associated with a single subscriber identity module (SIM). As a result, a call to a particular mobile number, for example, causes only the user equipment (UE) with that SIM installed to ring. Thus, if a user forgets a work cell phone at home, they cannot receive or place calls on the work cell phone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A and 2B depict a graphical user interface (GUI) for utilizing the system of FIGS. 1A and 1B, in accordance with some examples of the present disclosure.

DETAILED DESCRIPTION

As mentioned above, people communicate in multiple ways, from different devices, and for different purposes. A user may have a work cell phone for conducting business, for example, and a personal cell phone for communicating with friends and family. Unfortunately, if the user has left a work cell phone at home and the user is at work, the user may be unable to receive or place work calls. Indeed, without the work cell phone, the user may not even be able to forward calls, for example, from the work cell phone to a work phone.

In another example, rather than using a conventional landline, some families may wish to have a "home" phone number, which is actually a mobile number, but that rings on all family members' cell phones or devices (collectively, user equipment, or "UEs"). When a call is received at the home number, it may be useful to ring multiple UEs—and multiple types of UEs
 at the same time to ensure the call is answered. This can enable emergency workers, such as fire and police for example, to reliably contact the family in case of emergency. So, for example, it may be useful for the home number to ring on multiple cell phones, tablets, laptops and other UE at the same time.

The same can be said for e-mails, text messaging, calendars, and other functions for which users have multiple accounts. In the above scenario where the user has left the work cell phone at home, the user also cannot receive or send text messages to or from the work mobile number. Thus, calls and text messages to clients may go unanswered simply because the client does not recognize the number, and calls and text messages from a client to the work phone will go unanswered because the employee is not currently in possession of the work phone.

It would be useful, therefore, to provide a mechanism by which a user could consolidate all of their communications channels in a single location. Such a system could provide a website or application, for example, that enables a user to place and receive calls from multiple phone numbers, check and synch multiple calendars, send and receive text messages from multiple numbers, and consolidate all e-mails into a single location on any compatible, internet-connected device using a single login. It is to such a system that examples of the present disclosure are directed.

Figure 1A:
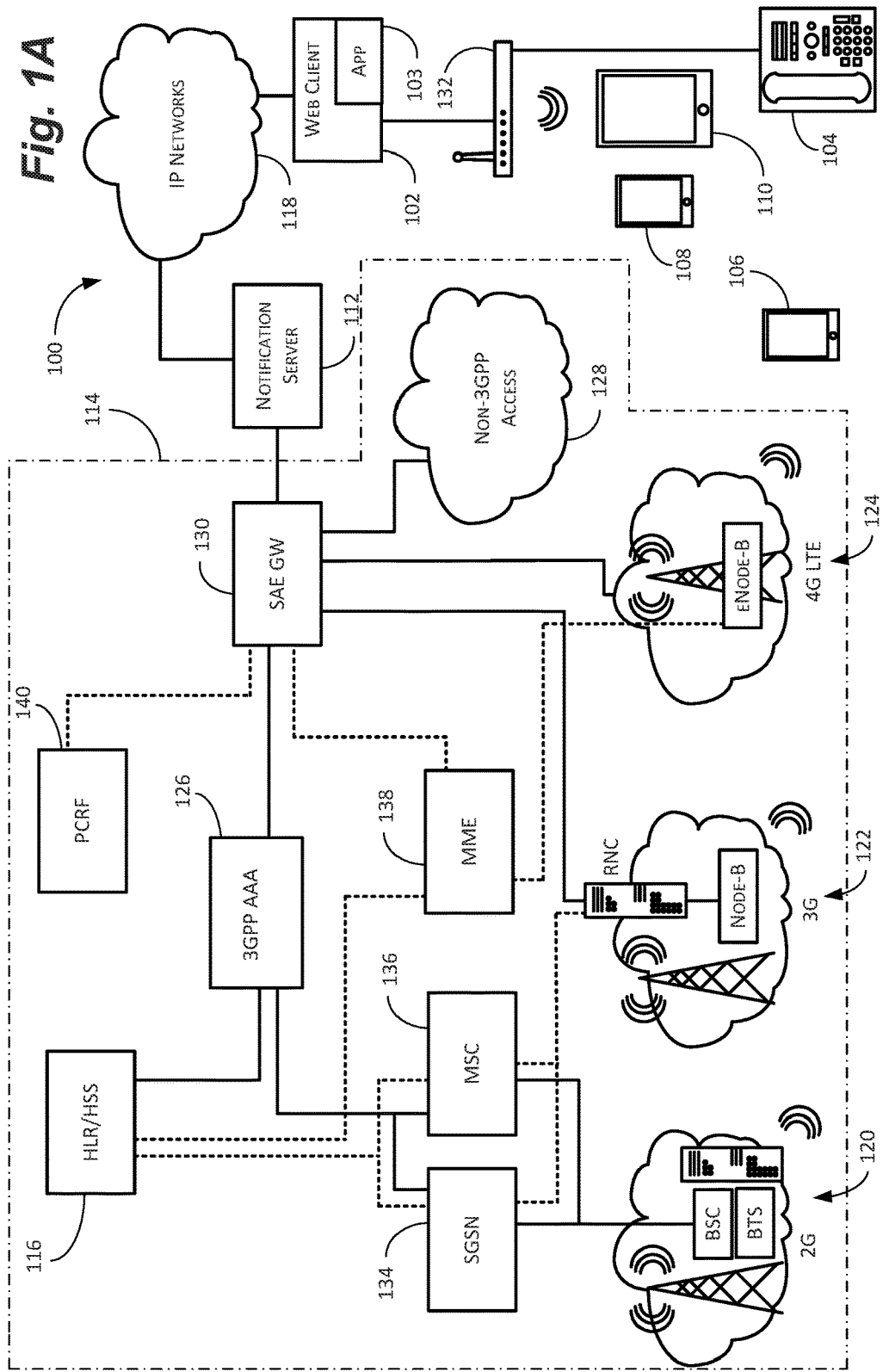
FIG. 1A depicts a system for routing communications via an IP network and a cellular network, in accordance with some examples of the present disclosure.

FIG. 1A is an example of such a system 100 for consolidating multiple communications channels. The system 100 can include a WebRTC client 102 that enables users to access all of their cellular phone numbers, e-mail addresses, calendars, etc. from any compatible, internet-connected device. Thus, a user's work phone 104, work cell phone 106, personal cell phone 108, tablet 110 and other devices can all ring in response to, for example, a call being placed to the work cell phone 106 (i.e., in addition to the work cell phone 106 itself ringing). Conversely, any of the UEs 104, 106, 108, 110 can be used to place a call from the mobile station international subscriber directory number (MSISDN), or "mobile number," of the work cell phone 106 using the WebRTC client 102.

Indeed, the UEs 104, 106, 108, 110 can be used to place a call with the mobile number of any of the other UEs 104, 106, 108, 110 that are subscribed to the same cellular provider. In other words, if the same provider is associated with the work cell phone 106 and personal cell phone 108, then both UEs 106, 108 can be added to the WebRTC client 102. The user can then log in to the WebRTC client 102 from any compatible, internet-connected device and utilize the mobile number for either UE 106, 108 to make calls, send text messages, etc.

Because both UEs 106, 108 are associated with the same cellular provider, routing calls to and from the various UEs 104, 106, 108, 110 is basically a matter of authorization and routing. So, for example, a user can log in to the WebRTC client 102 from an internet-connected tablet 110 using a suitably secure method (e.g., user ID and password, fingerprint, etc.). The IP address of the tablet 110 can then be associated in the suitable "back-end" components of the cellular network—e.g., the home location register (HLR) and third generation partnership project authentication, authorization, and accounting (3GPP AAA) server—with any mobile numbers of any of the UEs that have been entered into the application. When a call is received for the work cell phone 106, for example, the HLR can be configured to route the call to the work cell phone 106 via the cellular network (as normal) and the tablet 110 via an IP network.

As discussed below, the user can add any authorized mobile number—i.e., mobile numbers from the same provider for which the user is authorized by the provider to use—to the application to be accessed from any compatible internet-connected device. Once added, the user can use the phone number to receive calls at, and make calls from, the WebRTC client 102. The user can also send and receive text messages, import contacts, sync calendars, and perform other functions.

In the example above, for instance, a user who has left their work cell phone 106 at home, but is at work or out and about, can simply access the WebRTC client 102 from their personal cell phone 108, for example, via the internet. In this configuration, the personal cell phone 108 can be set to ring when calls are received at the number associated with the work cell phone 106 (or any other number the user has added to the WebRTC client 102). In addition, the personal cell phone 108 can be used to place calls using the number associated with the work cell phone 106 by using the WebRTC client 102. This can avoid confusion when calling clients, for example, who may recognize the number associated with the work cell phone 106, but not the number associated with the personal cell phone 108.

To this end, the provider can provide the WebRTC client 102, which may include an application 103, and a notification server 112. Of course, in some examples, the provider may commission an outside company (e.g., an application provider) to provide the application 103 and/or WebRTC client 102; though this may require providing access to various databases and/or back-end components (e.g., the HSS/HLR) to the application provider. As discussed below, the application 103 can provide a suitable login method for the user to securely log in to the WebRTC client 102 such as, for example, a user ID and suitably secure password, a fingerprint authorization, two-stage authorization, etc. The application 103 can also include a plurality of graphical user interfaces (GUIs) to enable users to add mobile numbers, send and receive calls and text messages, check e-mail, etc.

The notification server 112 can comprise a server, desktop computer, laptop computer, tablet, or cloud based server configured to "liaise" between the WebRTC client 102 and the larger cellular network 114. As discussed below, therefore, the notification server 112 can provide phone numbers and IP addresses to various network nodes such as, for example, the home location register (as it is called on the 2G and 3G network 122) or home subscriber server (as it is called on the 4G LTE network 124), which is referred to hereinafter as the HLR/HSS 116. This can enable calls to the various numbers to be properly routed to both the UE to which it is directed (e.g., the work cell phone 106) via the cellular network 114 and the UE connected to the WebRTC client 102 (e.g., the personal cell phone 108) via one or more IP networks 118.

FIG. 1A also depicts a cellular network 114 including 2G 120, 3G 122, and 4G long-term evolution (LTE) 124 components. Of course, future technologies, such as, for example, 5G, internet of things (IoT), and device-to-device (D2D) components could also be included and are contemplated herein. As mentioned above, many of the "back-end" components of the network 114 currently handle some, or all, of the call routing needed for cellular call connection. Indeed, some, or all, of the aforementioned WebRTC client 102 and/or notification server 112 could be located on one or more of, for example, the HLR/HSS 116, a 3GPP AAA server 126, or other components. In other words, the WebRTC client 102 and/or notification server 112 can be standalone or can be integrated into one of the existing network components.

As is known in the art, data can be routed from the Internet or other sources using a circuit switched modem connection (or non-3GPP connection) 128, which provides relatively low data rates, or via IP based packet switched connections, which results is higher bandwidth. The LTE network 124, which is purely IP based, essentially "flattens" the architecture, with data going straight from the internet to the service architecture evolution gateway (SAE GW) 130 to evolved Node B transceivers, enabling higher throughput. Many UEs 104, 106, 108, 110 also have wireless local area network (WLAN) 132 capabilities, in some cases enabling even higher throughput.

The serving GPRS support node (SGSN) 134 is a main component of the general packet radio service (GPRS) network, which handles all packet switched data within the cellular network 114—e.g. the mobility management and authentication of the users. The MSC 136 essentially performs the same functions as the SGSN 134 for voice traffic. The MSC 136 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 136 sets up and releases the end-to-end connection, handles mobility and hand-over requirements during the call, and takes care of billing and real time pre-paid account monitoring.

Similarly, the mobility management entity (MME) 138 is the key control-node for the 4G LTE network 124. It is responsible for idle mode UE 104, 106, 108, 110 paging and tagging procedures including retransmissions. The MME 138 is involved in the bearer activation/deactivation process and is also responsible for choosing the SAE GW 130 for the UE 104, 106, 108, 110 at the initial attach and at time of intra-LTE handover involving core network (CN) node relocation (i.e., switching from one cell site to the next when traveling). The MME 138 is responsible for authenticating the user (by interacting with the HLR/HSS 116 discussed below). The non-access stratum (NAS) signaling terminates at the MME 138 and it is also responsible for generation and allocation of temporary identities to UE 104, 106, 108, 110. The MME 138 also checks the authorization of the UE 104, 106, 108, 110 to camp on the service provider's HPLMN or VPLMN and enforces UE 104, 106, 108, 110 roaming restrictions on the VPLMN. The MME 138 is the termination point in the network for ciphering/integrity protection for NAS signaling and handles the security key management. The MME 138 also provides the control plane function for mobility between LTE 124 and 2G 120/3G 122 access networks with the S3 interface terminating at the MME 138 from the SGSN 134. The MME 138 also terminates the S1a interface towards the home HLR/HSS 116 for roaming UEs 104, 106, 108, 110.

The HLR/HSS 116 is a central database that contains user-related and subscription-related information. The functions of the HLR/HSS 116 include functionalities such as mobility management, call and session establishment support, user authentication and access authorization. The HSS, which is used for LTE connections, is based on the previous HLR and authentication center (AuC) from CGMA and GSM technologies, with each serving substantially the same functions for their respective networks.

To this end, the HLR/HSS 116 can also serve to authenticate the WebRTC client 102 and/or application 103 to prevent unauthorized call routing. So, for example, the application 103 can receive log in information from the user to validate the user and can then provide the HLR/HSS 116 with the necessary credentials to provide routing information. Once authenticated, the WebRTC client 102 and/or application 103 can provide routing information to the HLR/HSS 116 including, for example, one or more mobile numbers that are to be associated with one or more IP addresses (in addition to the international mobile equipment identity (IMEI) of the UE 106, 108 to which the mobile number belongs). The HLR/HSS 116 can then ensure the user is authorized to use the requested mobile number, for example, or send an authorization request to the 3GPP AAA server 126, discussed below.

The policy and charging rules function (PCRF) 140 is a software node that determines policy rules in the cellular network 114. The PCRF 140 generally operates at the network core and accesses subscriber databases (e.g., the HLR/HSS 116) and other specialized functions, such as content handling (e.g., whether the user has sufficient data left in their plan), in a centralized manner. The PCRF 140 is the main part of the cellular network 114 that aggregates information to and from the cellular network 114 and other sources (e.g., IP networks 118). The PCRF 140 can support the creation of rules and then can automatically make policy decisions for each subscriber active on the cellular network 114. The PCRF 140 can also be integrated with different platforms like billing, rating, charging, and subscriber database or can also be deployed as a standalone entity.

Finally, the 3GPP AAA server 126 performs authentication, authorization, and accounting (AAA) functions and may also act as an AAA proxy server. For WLAN 132 access to (3GPP) IP networks 118 the 3GPP AAA server 126 provides authorization, policy enforcement, and routing information to various WLAN components. The 3GPP AAA server 126 can generate and report billing/accounting information, performs offline billing control for the WLAN 132, and perform various protocol conversions when necessary. Thus, the 3GPP AAA server 126 can determine if the user is authorized to use the mobile number and handle some or all of the routing from the HLR/HSS 116 to the WebRTC client 102, among other things.

In some examples, the HLR/HSS 116 and/or 3GPP AAA server 126 can contain some, or all, of the components of the system 100. In some examples, the HLR/HSS 116 and/or 3GPP AAA server 126 can include, for example, the WebRTC client 102, notification server 112, and other functions. Of course, as mentioned above, other components (e.g., the PCRF 140 or MME 138) could also include some, or all, of the system 100.

Figure 1B:
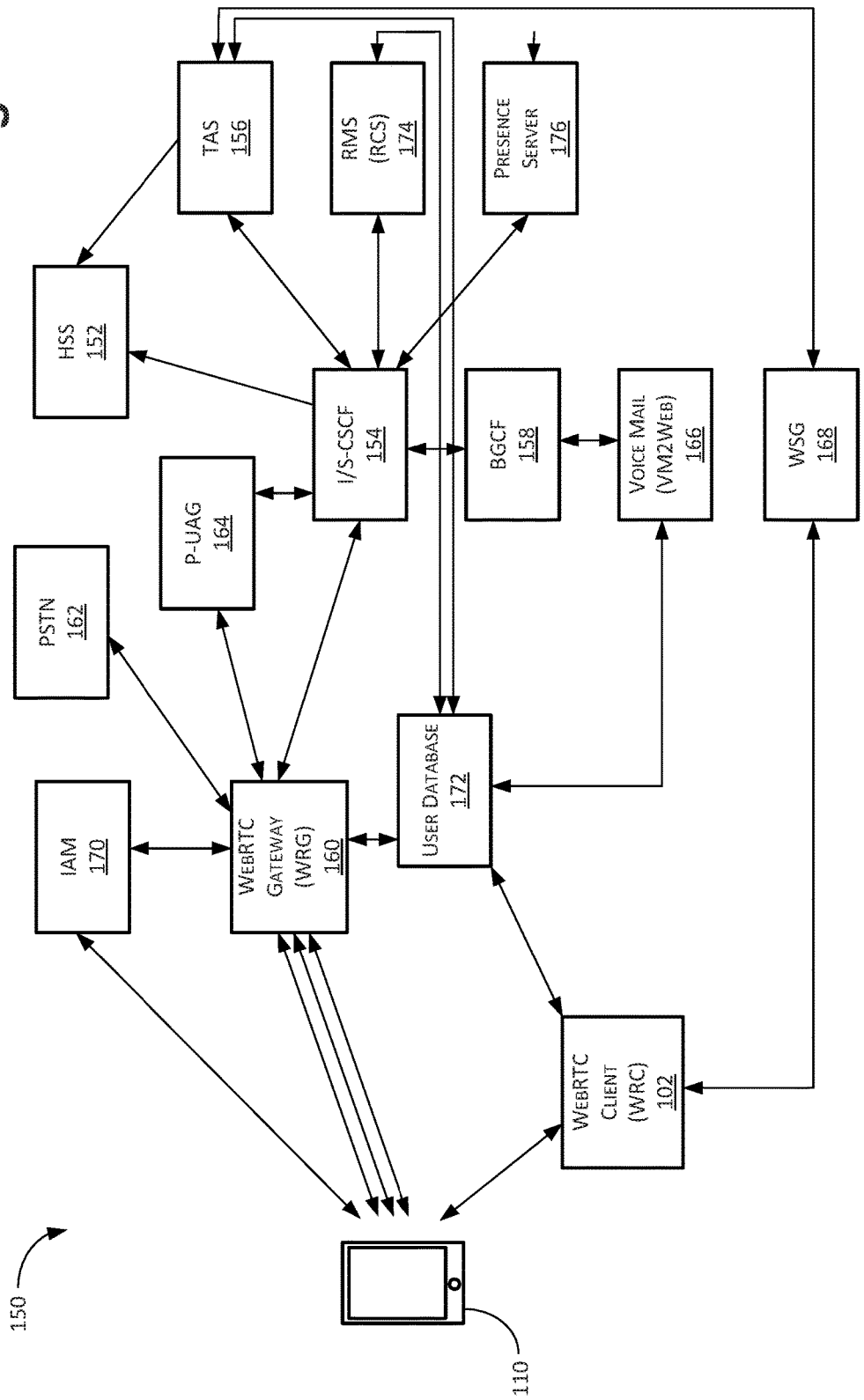
FIG. 1B depicts an internet protocol multimedia subsystem (IMS) of the network of FIG. 1A, in accordance with some examples of the present disclosure.

FIG. 1B includes a more detailed view of the components of the internet protocol multimedia subsystem (IMS) 150 portion of the LTE network 124. As shown, the IMS 150 includes several network components for routing signals, storing subscriber information, and connecting across various subsystems and network types, including adding the necessary routing for the system 100 to operate, as discussed above. The IMS 150 is built on session initiation protocol (SIP) as the base to further support packaging of voice, video, data, fixed, and mobile services on a single platform to end users. The IMS 150 enables communications across multiple types of networks, including cellular, satellite, broadband, cable, and fixed networks, and enables the creation of efficient interoperating networks, as discussed herein.

As mentioned above, the IMS 150 provides interoperability for UEs 104-110 and other devices across multiple platforms including, for example, 2G 120, 3G 122, 4G 124, IP 118 networks. The IMS 150 also includes some components already discussed more generally in FIG. 1A. These include, for example, the HLR/HSS 116. For clarity, however, in FIG. 1B the HLR/HSS 116 is discussed separately as the HSS 152 (i.e., the 4G LTE version of the HLR/HSS 116). As discussed above, the HSS 152 (sometimes also called the user profile server function (UPSF)), is a master user database that supports the other network entities that handle calls, route messages, etc. The HSS 152 includes subscription-related information (e.g., subscriber profiles), performs authentication and authorization of the user, and can provide information about the subscriber's location and IP address, among other things. As such, it can provide routing information to and from the user's cellular numbers and IP addresses, as discussed below. FIG. 1B is shown for use with the tablet 110; however, this is merely for ease of explanation. The IMS 150, WebRTC client 102, and other functions are also for use with the other UEs 104-108; and, indeed, any UE suitable for use with the networks 120-124 discussed herein.

The IMS 150 also includes an interrogating-call session control function/serving-call session control function (I/S-CSCF) 154. The I-CSCF portion of the I/S-CSCF 154 acts as an inbound SIP proxy server in the IMS 150. During IMS registrations, the I-CSCF queries the HSS 152 to select the appropriate S-CSCF (discussed below) which can serve the UEs 104-110. During IMS 150 sessions, the I-CSCF acts as the entry point to terminating session requests. The I-CSCF also routes the incoming session requests to the S-CSCF of the called party.

The S-CSCF portion of the I/S-CSCF 154 acts as a registrar server, and in some cases as a redirect server. The S-CSCF facilitates the routing path for mobile originated or mobile terminated session requests. The S-CSCF also interacts with various components for playing tones and announcements, among other things. The S-CSCF can also receive subscriber information from the HSS 152 and establish the appropriate sessions with telephony application servers (TASs) 156 (discussed below). In some configurations, the I-CSCF and S-CSCF can be included in a single entity (e.g., a single server); and thus, is commonly referred to simply as the I/S-CSCF 154. The I/S-CSCF 154 can handle SIP messaging including, for example, invite, info, options, notify, refer, message, update, ACK (acknowledge), cancel, and bye. The I/S-CSCF 154 can handle routing to and from the UE 110 via the WRG 160 to enable users to receive cellular calls, for example, on the UE 110 via the IP networks 118.

The IMS 150 also includes one or more TASs 156. As the name implies, the TAS 512, sometimes known in a telephony context merely as an application server (AS), is a component used to provide telephony applications and additional multimedia functions. The TAS 512 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 1B, multiple TASs 512 are generally used to provide multiple services. Based on the which services the UE 104-110 is attempting to use, for example, the I/S-CSCF 154 can establish sessions with one or more TASs 156, generally with one TAS 156 for each service.

The IMS 150 also includes a breakout gateway control function (BGCF) 158. The BGCF 158 is the IMS 150 element that selects the network in which public switched telephone network (PSTN) 162 (discussed below) breakout is to occur. If the breakout is to occur in the same network as the BGCF 158, for example, then the BGCF 158 selects a WebRTC gateway (WRG) 160 (also discussed below) that will be responsible for interworking with the PSTN 162. The WRG 160 then receives the SIP signaling from the BGCF 158.

The IMS 150 also includes the WRG 160. The WRG 160 is a SIP endpoint that handles call control protocol conversion between SIP and ISDN user part (ISUP)/bearer-independent call control (BICC) and interfaces with the SAE GW 130 over stream control transmission protocol (SCTP). The WRG 160 can also include a media gateway (MGW) across an H.248 interface. The MGW is a translation device or service that converts media streams between disparate telecommunications technologies such as PSTN, SS7, next generation networks (2G 406, 3G 408, and 4G 410) or private branch exchange (PBX) systems.

The IMS 150 also includes the PSTN 162. The PSTN 162 is the world's collection of interconnected voice-oriented public telephone networks, both commercial and government-owned. It's also referred to as the plain old telephone service (POTS). With respect to IP phones 414, for example, the PSTN 162 furnishes much of the Internet's long-distance infrastructure. Because Internet service providers (ISPs) often pay long-distance providers for access to their infrastructure and share the circuits among many users through packet-switching (discussed above), Internet users avoid having to pay usage tolls to anyone other than their ISPs.

The IMS 150 can also include the proxy unified access gateway (P-UAG) 164. The P-UAG 164 can provide a secure socket layer (SSL) virtual private network (VPN), application firewalls for web applications (such as the application 103), and endpoint security management to enable access control, authorization, and content inspection for the application 103 (and other web-based apps). The P-UAG 164 provides a portal for the WebRTC client 102 and/or the application 103. The P-UAG 164 can also perform compliance checks before allowing the application 103 to access various components (e.g., the VM2Web server 166, discussed below). The P-UAG 164 can also check various features on the UEs 104-110 running the WebRTC client 102 and/or the application 103 such as, for example, the domain name, antivirus definitions status, or what processes are running on the UEs 104-110. The P-UAG 164 and the WRG 160 can use SIP messaging to register, subscribe, and publish, among other things.

The IMS 150 can also include a web-based voicemail server (VM2Web) 166. As the name implies, the VM2Web 166 can store the user's voicemail messages and can be accessible via the WebRTC client 102 and/or the application 103. As discussed above, the system may store voicemails from multiple accounts, including both cellular- and IP-based accounts.

The IMS 150 can also include a web services gateway (WSG) 168. The WSG 168 can provide a single point of control, access and validation of Web service requests, and can control which services are available to different groups of users. The WSG 168 can enable the WebRTC client 102 and/or the application 103 to make different web services available to different users. The WSG 168 can provide a common interface to the services for each type of user.

As mentioned above, the WSG 168 can communicate with the P-UAG 164 to establish SIP sessions with SIP register subscribe, and publish messaging. The WSG 168 can also communicate with the UE 110 via various web-sockets and real-time transfer protocol/secure real-time transfer protocol (RTP/SRTP). The WSG 168 can also communicate with the WebRTC client 102 to provide the application 103 on the UE 110, among other things. The WSG 168 can also conduct SIP messaging to/from the I/S-CSCF 154 for invite, info, options, notify, refer, message, update, ACK (acknowledge), cancel, bye, and other functions.

The IMS 150 can also include an identity and access management server (IAM) 170. The IAM enables authorized users to access various resources. The IAM 170 enables the IMS 150 to control access across multiple networks (e.g., 2G 120, 3G, 122, 4G LTE 124, and IP networks 118). The IAM 170 manages identifying users and ancillary data about users, hardware, and software applications. The IAM 170 also enables users to create and protect an account or profile and manages the mechanisms uses to protect the account (e.g., network protocols, digital certificates, passwords, etc.).

The IMS 150 can also include a user database 172. The user database 172 can be in communication the application 103, for example, and can store, for example, all of the user's messages, contacts, call logs, etc. When the user initially logs-in to the application 103, the WebRTC client 102 can pull the data from the user database 172 to update these features. In addition, if the user is offline, a copy of all messages for that user can be store in the user database. When the user is back online, therefore, the application 103 is up-to-date.

The IMS 150 can also include a rich messaging server (RMS) 174. The RMS 174 can use features afforded by rich communications services (RCS) to enable users to send text messages. Unlike the older short messaging service (SMS), however, RCS enables users to send text messages that include pictures, video, emojis, and other content. Thus, the RMS 174 provides an interface between users and manages and routes rich messages.

The IMS 150 can also include a "presence" server 176. The presence server 176 (which in reality is likely multiple entitles in the IMS 150) can provide presence information, which is a status indicator that conveys the availability of a potential communication partner—e.g., another UE 104-110—to communicate. The WebRTC client 102, for example, can provide presence information (presence state) via the IMS 150 to the presence server 176. This information can be stored in a personal availability record, or a "presentity," which can be made available for distribution to other users (called "watchers") to indicate the UE's 104-110 availability for communication. Presence information is useful for instant messaging and VOIP clients, among other things.

Figure 2A:
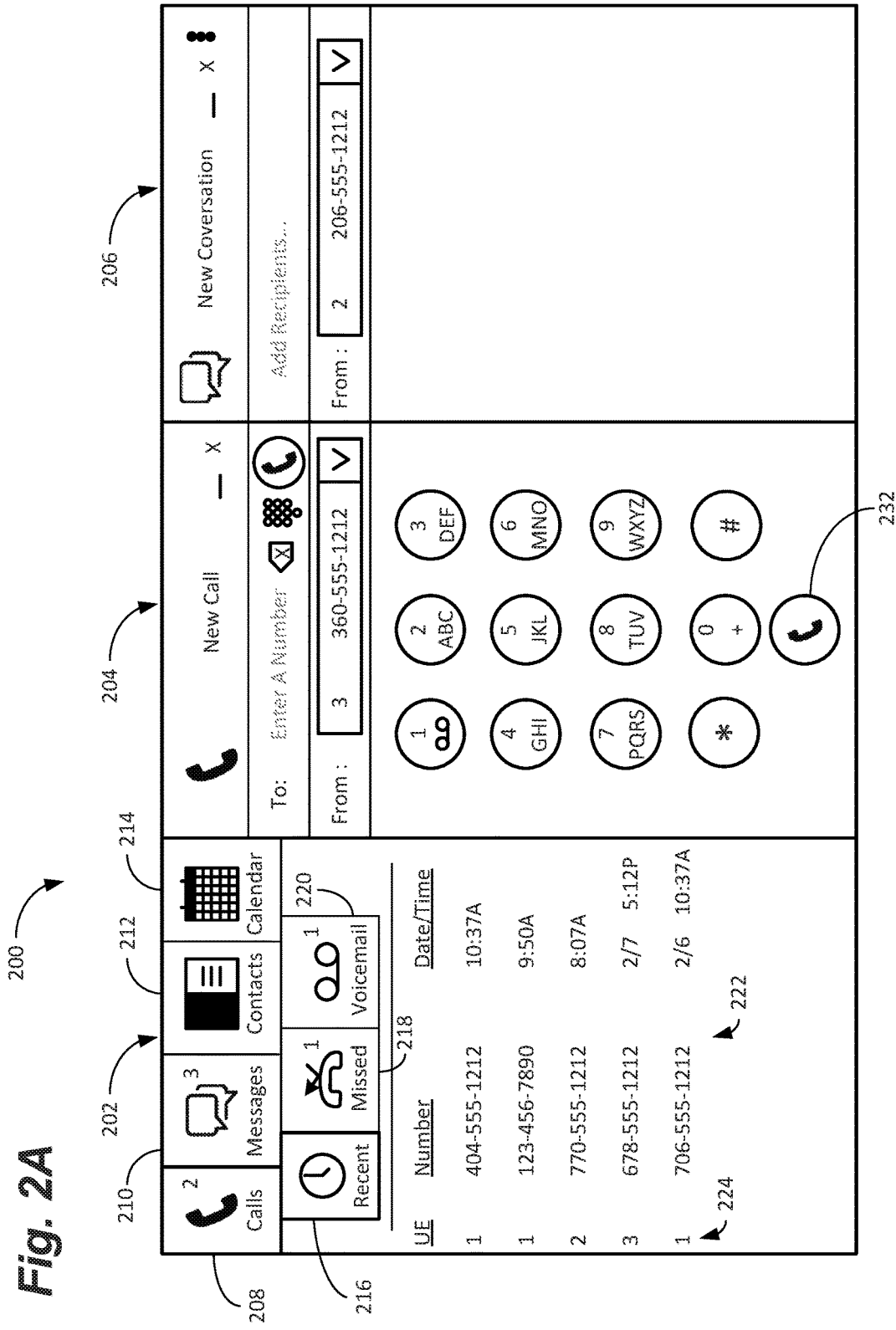

As shown in FIG. 2A, examples of the present disclosure can also include a GUI 200, which may be provided in the application 103, for example, and can enable the user to consolidate communications channels. The application 103 can include a number of application programming interfaces (APIs) that perform the functions discussed below. Thus, selecting the send button 232 (discussed below), for example, can invoke an API to initiate a voice over IP (VOIP) call.

As shown, the GUI 200 can include multiple tabs 202, 204, 206 that can change based on the user's selections. A first tab 202 can include a number of icons, or buttons, to enable the user to select various functions. So, for example, the buttons can include a call button 208, a text button 210, a contacts button 212, and a calendar button 214 similar to those available on many UE. The GUI 200 may also include additional functions not pictured in FIG. 2A such as, for example, e-mail to enable the user to check one or more e-mail addresses in the application 103 or messaging applications to enable to user to check one or more messaging applications in the application 103. In this case, however, some of the buttons can invoke functions not available on current UEs.

To this end, as shown in FIG. 2A, the user can select the call button 208 to initiate a call, add a mobile number to the application 103, or receive a call, among other things. With the call button 208 selected, familiar features such as, for example, a recent call button 216, missed call button 218, and voicemail button 220 appear in the first tab 202. Significantly, however, in this case, the recent call button 216, for example, can include some additional information.

In other words, because the recent call list 222 can include more than one mobile number, it is helpful to indicate with which mobile number each of the recent calls in the recent call list 222 is associated. In this example, the user has added three numbers to the application 103 (see, FIG. 2B, below). As a result, the recent call list 222 can include an indicator 224 for each of the UEs. In this case, the indicator 224 is simply a number, indicating which mobile number is associated with the call in the recent call list 222:

| Indicator | Mobile number |
|---|---|
| 1 | 912-123-4567 |
| 2 | 404-123-4567 |
| 3 | 360-555-1212 |

And, while shown as a numeral, the indicator 224 could be an icon, the actual phone number, a text string, or other information. This can enable the user to identify which mobile number a caller was trying to reach, for example, or from which number a call was placed when reviewing the call history.

As shown in FIG. 2B, when the call button 208 is selected, a call dialog box 226 also appears in the second tab 204. The call dialog box 226 has some familiar features such as, for example, a recipient field 228, a dialer 230, and a send button 232. Importantly, however, the call dialog box 226 also includes a sender field 234. This field is normally fixed for each UE, such that the user generally does not choose the sender field 234. Rather, the sender field is generally fixed by the provider for each UE as the MSISDN, or mobile number. So, for example, when dialing from the user's work cell phone 106, the call always comes from the mobile number of the work cell phone 106. As a result, the mobile number of the work cell phone 106 appears in the caller ID of the recipient, among other things.

In this case, because the application 103 can be associated with multiple mobile numbers, however, the sender field 234 can be editable or can include a call drop-down menu 236 (shown). In some examples, the call drop-down menu 236 can include the aforementioned indicator 224 and the respective mobile number 238 associated with each indicator. In this case, the user has associated three mobile numbers 238 with the application 103; and thus, can choose between any of the three when placing a call. Thus, in the scenario discussed above where the user has forgotten their work cell phone 106, the user can log in to the application 103, select the mobile number for the work cell phone 106 in the call drop-down menu 236, and place a call using this mobile number. Indeed, as far as the recipient is concerned, the call is coming from the work cell phone 106. In other words, when the recipient's UE rings, the mobile number 238 for the work cell phone 106 appears on the screen and in the recipient's call logs as normal.

In this example, therefore, the user can first enter or select a number to dial in the recipient field 228. This can be typed in directly on the dialer 230, for example, or selected from the contacts by pressing the contacts button 212. The user can then select a mobile number 238 to use from the call drop-down menu 236, e.g., select mobile number (1)-912-123-4567 from the drop-down menu 236, and then press the send button 232 to place the call. In this example, though the call is being placed from the user's tablet 110, for example, the call appears to the recipient to come from 912-123-4567.

Interestingly, at the same time, the third tab 206 can include a text interface 240 with a separate text drop-down menu 242. Like the call drop-down menu 236, the text drop-down menu 242 can include all the mobile numbers 250 associated with the application 103. This can enable the user to send text messages from any of the mobile numbers 250 associated with the application 103—or at least any mobile number that is authorized to send text messages. In other words, the work cell phone 106, for example, may have usage restrictions that prevent sending text messages and so may not be included in the text drop-down menu 242.

As shown, therefore, the user can enter or select a recipient in the text recipient field 244. As before, this can be done by simply typing the number into the text recipient field 244 or by selecting the contacts button 212, among other things. The user can then select the appropriate mobile number 250 from the text drop-down menu 242—e.g., mobile number (2)-404-123-4567—and then enter text into the text box 246. When complete, the user can send the text message to the recipient by selecting the send button 248. Thus, in all respects, the text messaging process is relatively conventional; but significantly, the user can select the mobile number 250 from which the text is sent. Also novel is the fact that the user is calling from mobile number (1) and texting from mobile number (2) at the same time.

Referring back to FIG. 1B, to ensure that the user is authorized to use all three mobile numbers, some authentication is required. In some examples, therefore, the application 103 can prompt a login from the user. The login can comprise, for example, a user ID and a password from the user. The user ID can comprise the user ID associated with the user's account with the cellular provider, for example, the user's e-mail address, or some other suitable ID. The requirements for the password can be set by the cellular provider to include various characters for the desired level of security. In some examples, the log in can be linked to a fingerprint or facial recognition scan provided by an application on the UE.

Regardless of how the user logs in to the application 103, the application 103 can also be validated on both the IP network 118 and the cellular network 114. To this end, the application 103 can be authorized on the IP network 118 via the UE (e.g. the tablet 110) and the WLAN 132 in the normal manner. The WLAN 132 can include a wired or wireless router, for example, in communication with a modem authorized by the IP provider (e.g., a cable or fiber internet provider) to connect to the IP network 118, such as an intranet or the Internet.

The application 103 can then contact an entity at the cellular network 114, such as the aforementioned notification server 112 for authorization, for example, to modify routing tables stored on the HLR/HSS 116, add entries to the 3 GPP AAA server 126, and make other changes as necessary. In this case, because the application 103 is provided by the cellular service provider, the application 103 may include the necessary provisions to be automatically authorized by the notification server 112. In other words, the application 103 can include, for example, embedded digital certificates, public/private keys, or other security measures to enable it to be authorized by the notification server 112 and other cellular network 114 components.

In some examples, the application 103 can act merely as an interface between the user and the notification server 112, HLR/HSS 116, 3GPP AAA server 126, and other entities. In other words, the user can add a mobile number to the application 103 and then attempt to place a call from, for example, mobile number (1)-912-123-4567. The application 103, in turn, can send an encrypted message to the notification server 112 indicating that the user associated with a particular user ID has been properly authenticated at the application level and wishes to place a call from mobile number (1). The notification server 112 can then determine whether the user ID is associated with mobile number (1). If so, the notification server 112 can pass the message along to the HLR/HSS 116 to complete the call. If not, the notification server 112 does not complete the call, but can return an error message to the application 103 reporting an unauthorized use.

In some examples, the application 103 may display an error message on the GUI 200, for example, to alert the user to the error and to provide additional information. The error message can include the reason for the failure—e.g., user ID and mobile number (1) do not match. If the user has simply mistyped, for example, the user can retype and retry the call. If the user is truly unauthorized, then the user has been prevented from using mobile number (1).

In other examples, all authentication can be handled on the notification server 112. In other words, the application 103 can send a message to the notification server including, for example, the user ID, password, mobile number, and call request. In this case, the application 103 merely provides the appropriately formatted and/or encrypted message to the notification server, with no authorization (including login) performed at the application 103 level. Again, based on whether the user ID and password are correct and whether the user ID is associated with the requested mobile number, the notification server 112 can either (1) pass the message along to the HLR/HSS 116, for example, to complete the call or (2) return an error message to the application reporting an unauthorized use.

Figure 3:
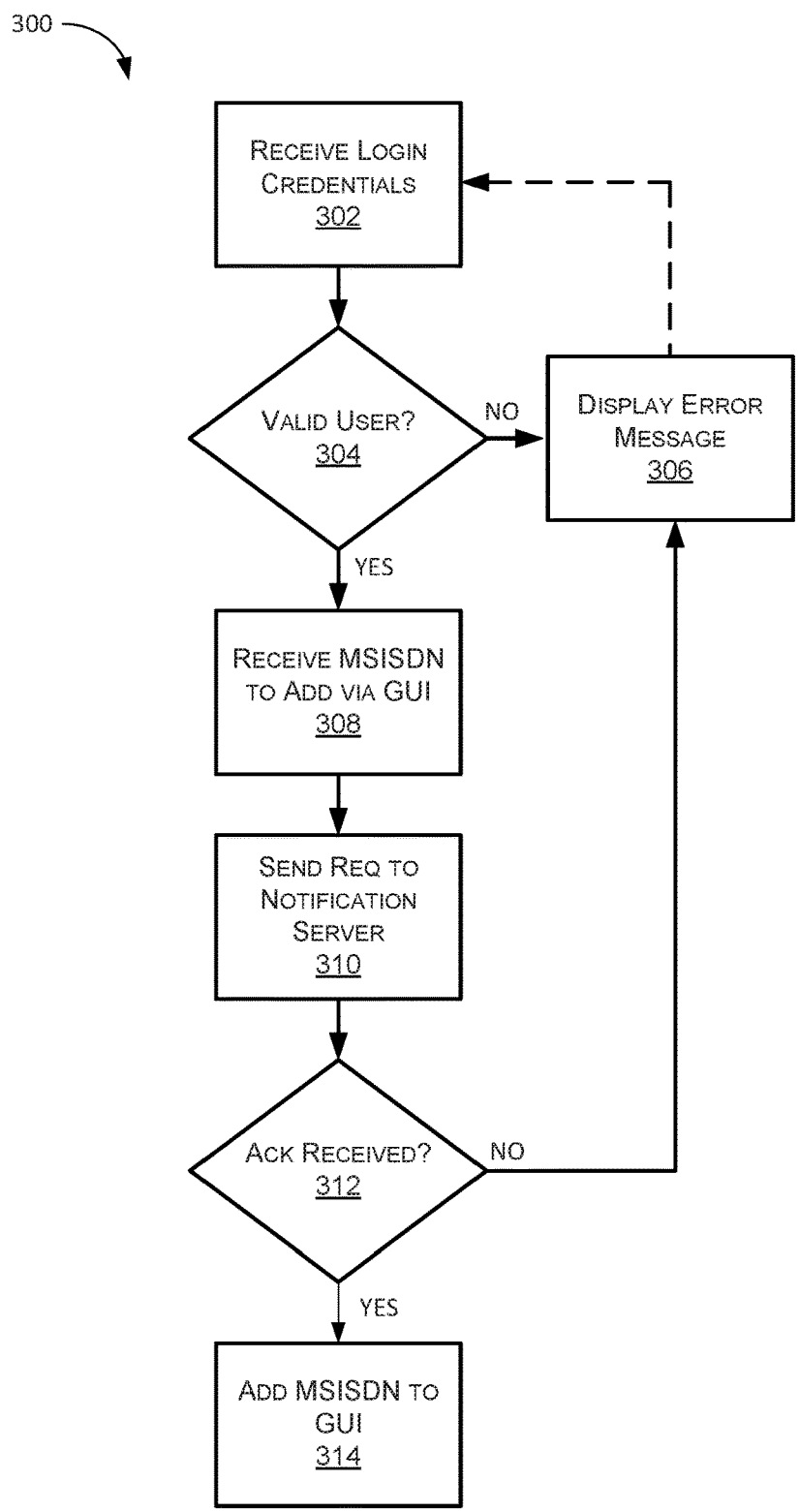
FIG. 3 is a flowchart that depicts an example method for receiving, approving, and adding a new mobile station international subscriber directory number (MSISDN) to the system, in accordance with some examples of the present disclosure.

As shown in FIG. 3, examples of the present disclosure can include a method 300 for adding new mobile numbers to the application 103. As mentioned above, to prevent unauthorized use, the application 103, the notification server 112, or other network entity (e.g., the 3GPP AAA server 126) can authorize the user to use any mobile number associated with the user's account. This may be multiple mobile numbers that are included directly on the user's account—e.g., their personal cell phone 108 and work cell phone 106—or a mobile number that the user has been authorized to use by another user (e.g., a family member or colleague).

At 302, therefore, the application 103 can receive log in credentials from the user. As mentioned above, this can include receiving a user ID, which may be the user ID associated with the user's cellular account, or another user ID. This can also include receiving a password, fingerprint, facial scan, or other security measure.

At 304, the method 300 can determine if the user ID and password match, or if the user is otherwise validated. This can include the application 103 checking the credentials internally or sending an appropriate message to the notification server 112 or other network entity. Thus, authentication may require an ACK message, or similar, from the cellular network 114.

At 306, if the user is not authenticated, in some examples, the application 103 can provide an error message. The error message can include a message and/or play a sound, for example, to alert the user to the failure. In some examples, the error message can also include a reason such as, for example, user ID and password do not match, user ID not found, etc. Authentication failure can result in the method 300 terminating or restarting at block 302 (as indicated by the dashed line), among other things. In some examples, after an authentication failure, the method 300 can return to 302 to provide the user with a predetermined number of additional chances (e.g., 2, or 3) to re-enter their credentials. If the user fails to be authenticated after the predetermined number of tries, then the method 300 can terminate and/or lock the user account. If the user is a valid user, but has forgotten their password, for example, the user can then call a help desk or send an e-mail, among other things, to unlock their account and/or reset their password, as necessary.

At 308, the application 103 can receive a new mobile number, or MSISDN, from the user via the GUI 200 and one or more inputs on the UE. As discussed above, the user can enter the mobile number via the dialer 230, for example, to be included in the application 103. At 310, the method 300 can send an ADD request (e.g., a session initiation protocol (SIP) message), for example, to the notification server 112 requesting that the mobile number be added to the application 103 and that the user be authorized to use the mobile number.

At 312, the method 300 can determine if the notification server 112 (or other entity) has authorized the user to use the mobile number. If the mobile number is the user's mobile number and is already associated with the user's account, this may simply be a matter of matching the user ID and the mobile number. If, on the other hand, the mobile number is associated with another user ID, then the notification server 112 can determine if the user has nonetheless been authorized to use the number (e.g., by a co-worker, family member, or friend). In some examples, the notification server 112 can merely send an acknowledgment message (e.g., a code 202—"accepted") if the user is approved and an error message (e.g., a code 401—unauthorized) if the user is not authorized to use the mobile number.

In some examples, the reply can also include additional information regarding the mobile number. The reply can include, for example, the services that are available on that particular mobile number. So, for example, a work mobile number may be authorized for voice calls only, or voice calls and cellular data (to check e-mail), but not text messaging. Some cell phones may also be unauthorized to make long distance or international calls. Regardless, this information may be included in the ACK message to prevent unauthorized uses (or even attempts) from the application 103.

At 306, if the user is not authorized to use the mobile number, the application 103 can again provide an error message, as discussed above. At 314, if the user is approved by the notification server 112, on the other hand, the mobile number can be added to the application 103 for use by the user. Thus, the mobile number can be added to the drop-down menus 236, 242 to enable the mobile number to be used for calls and text messaging, respectively. In some examples, the application 103 can also download call logs, contacts, voicemail, and other information associated with the mobile number.

Figure 4:
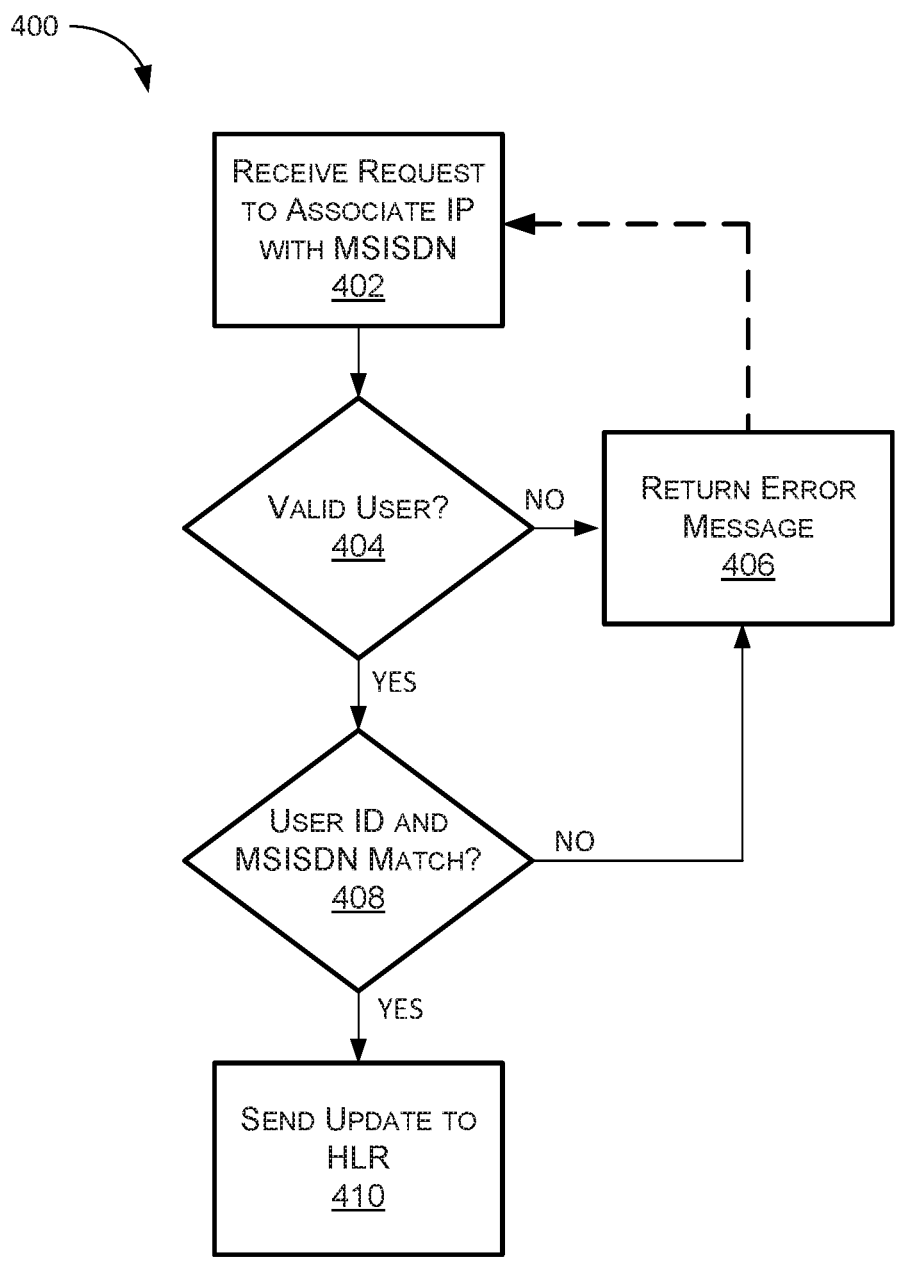
FIG. 4 is a flowchart that depicts an example method for approving a new MSISDN at a notification server and updating a home subscriber server/home location register (HSS/HLR), in accordance with some examples of the present disclosure.

As shown in FIG. 4, a similar method 400 can be used to update the IP address associated with the mobile number, as necessary. In other words, when the user logs on to the application 103, the IP address of the UE can be registered to receive calls on the mobile numbers associated with the application 103. Because the IP address can change from location to location and from one UE to the next, the IP address of the UE may need to be updated in the application 103 every time the application 103 is used, every time the user switches devices or changes locations, or periodically to maintain current addresses.

At 402, therefore, the notification server 112 can receive a request from the application 103 to associate an IP address with the mobile number. In some examples, the request can include a message that the user has been properly authenticated (e.g., has entered a valid user ID and password). In other examples, the request can include the user ID and password entered by the user for validation by the notification server 112.

At 404, in some examples, the notification server 112 can authenticate the user. In some examples, the user may be authenticated by virtue of using the application 103. In other words, the application 103 can be maintained by the cellular provider or the application provider and can include the desired level of security such that the application 103 is essentially "internally" valid. In this configuration, the fact that the application 103 is sending the request indicates that the user is properly logged into the application 103. In other examples, the application 103 can simply send the user ID and password in the request for validation by the notification server 112.

At 406, if the user cannot be authenticated, the notification server 112 can return an error message that the request cannot be completed. As before, the error message may also include the reasons why the request cannot be completed. In some examples, authentication failure can cause the method 400 to terminate. In other examples, the error message can be sent to the WebRTC client 102, for example, to cause the application 103 to prompt the user to reenter their credentials (returning to block 302 of method 300). Similar to above, therefore, the method 400 may return to block 402 to receive updated credentials for authentication (as shown by the dashed line). If the credentials cannot be authenticated within a predetermined number of attempts. the method 400 can terminate and/or the user account can be locked At 408 if, on the other hand, the user is authenticated, the notification server 112 can then determine if the user is authorized to use the mobile number. In other words, the user can first be authenticated to use the application 103 and then be authenticated to use the mobile number that has been entered. As before, in some examples, this step can be as simple as determining that the user ID and the mobile number are associated with the same cellular account. In other examples, the notification server 112 can determine if the user has been authorized using some other mechanism. A mobile number associated with the work cell phone 106 may be authorized for use by all employees, for example, or all managers. A virtual/mobile "home" phone number, on the other hand, can be authorized for use by all family members, for example, and the nanny.

At 410, if the user is authenticated to use the application 103 and the cellular number, the notification server 112 can send an update message to the HLR/HSS 116, 3GPP AAA server 126, and/or other network entities to update the necessary routing tables. Thus, when a call is received for the work cell phone 106, for example, the call is routed to the work cell phone 106 via the cellular network 114 and the tablet 110 via the IP network 118 in real-time (i.e., as quickly as is practical for each network to route the call).

In some examples, the routing tables can be updated to reflect the IP address of the notification server 112. In this configuration, the notification server 112 receives all calls from mobile numbers that have been associated with the application 103. When a call is received at the notification server 112, therefore, the notification server 112 locates the target IMEI and target IP address (if applicable) in the appropriate lookup table and completes the routing, rather than the HLR/HSS. In this example, the routing can be completed to the work cell phone 106 via the IMEI and the tablet 110 via the IP address. Thus, all entries in the HLR/HSS 116 lookup table either include an IMEI only or an IMEI and the IP address of the notification server 112 (or some equivalent message pointing to the notification server 112). This can reduce the load on the HLR/HSS 116 and simplify the lookup process somewhat, but obviously increases the load on the notification server 112.

In other examples, the lookup table in the HLR/HSS 116 can be updated to include the IP address for the target UE directly in the lookup table. In this configuration, all entries in the lookup table can either contain (1) only the IMEI associated with the mobile number or (2) the IMEI and an IP address for the target device. In this configuration, the HLR/HSS 116 can route both calls directly. In this example, the HLR/HSS 116 can route the call to the work cell phone 106 via the cellular network 114 and to the personal cell phone 108 and tablet 110 via the IP network 118.

In some examples, the application 103 can re-register each time the user logs on to the IP network 118, each time the user logs on to the application 103, or as necessary based on a change in the IP address of the UE. If the user logs in at home and later logs in at work, for example, the IP address will likely need to be updated to reflect the change in location, router, modem, etc. Similarly, if the user changes from the personal cell phone 108 to the tablet 110, the application 103 can re-register to account for a change in the IP address of the device itself.

Figure 5:
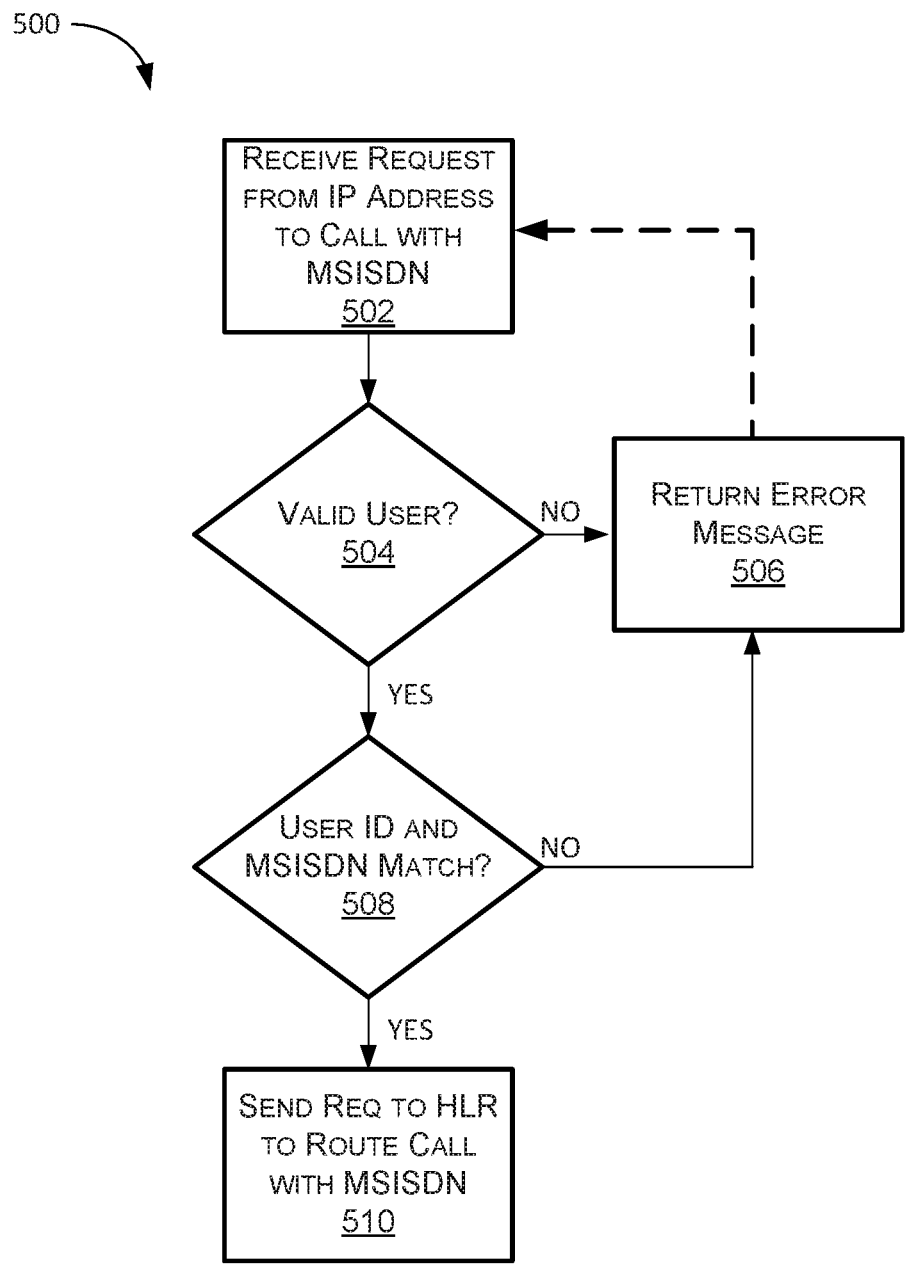
FIG. 5 is a flowchart that depicts an example method for approving and placing a call from a first user equipment (UE) using the MSISDN from a second UE, in accordance with some examples of the present disclosure.

As shown in FIG. 5, in some examples, the notification server 112 can be tasked with approving and routing calls from the application 103. Thus, when a call is received at the notification server 112 from the IP network 118, the notification server 112 can validate the user and the mobile number in a method 500 similar to the method 400 described above.

At 502, therefore, the notification server 112 can receive a request from an IP address to place a call using the mobile number. The request can come from the application 103, for example, initiated by the user pressing the send button 232 in the GUI. In some examples, the message can include the user ID and password, mobile number, destination number, and current IP address, among other things.

At 504, in some examples, the notification server 112 can authenticate the user. As before, in some examples, the user may be authenticated by virtue of using the application 103. In this configuration, the fact that the application 103 is sending the request indicates that the user is properly logged into the application 103. In other examples, the application 103 can simply send the user ID and password in the request for validation by the notification server 112.

At 506, if the user cannot be authenticated, the notification server 112 can return an error message that the call cannot be completed. As before, the error message may also include the reasons why the request cannot be completed. This may be because the mobile number is not associated with the user ID, the IP address is not suitable (e.g., it is a public or unsecure IP address), or some other network problem exists. In some examples, the method 500 can terminate. In other examples, the method can prompt the user to re-enter their credentials—e.g., the error message can cause the application 103 to display a dialog box to the user. In this configuration, the method 500 can return to 502 (as shown by the dashed line) to receive new credentials. If the user cannot be authenticated within a predetermined number of attempts (e.g., 3 or 5), then the user's account or IP address can be blocked, the application 103 can close, etc.

At 508, if, on the other hand, the user is authenticated, the notification server 112 can then determine if the user is authorized to use the mobile number. As before, in some examples, this step can be as simple as determining that the user ID and the mobile number are associated with the same cellular account. In other examples, the notification server 112 can determine if the user has been authorized using some other mechanism, discussed above.

At 510, if the user is authenticated to use the application 103 and the cellular number in steps 504 and 508, the notification server 112 can send a request to the HLR/HSS 116, for example, to route the call to the recipient using the mobile number. Thus, when a call is placed to the recipient using the mobile number associated with the work cell phone 106, for example, the call is routed to the recipient via the cellular network 114. In addition, the call (or text) appears to be coming from the mobile number. In other words, a call or text sent using the application 103 appears on the recipients UE and in the call or text logs to have come from the selected mobile number, not an IP address.

Figure 6:
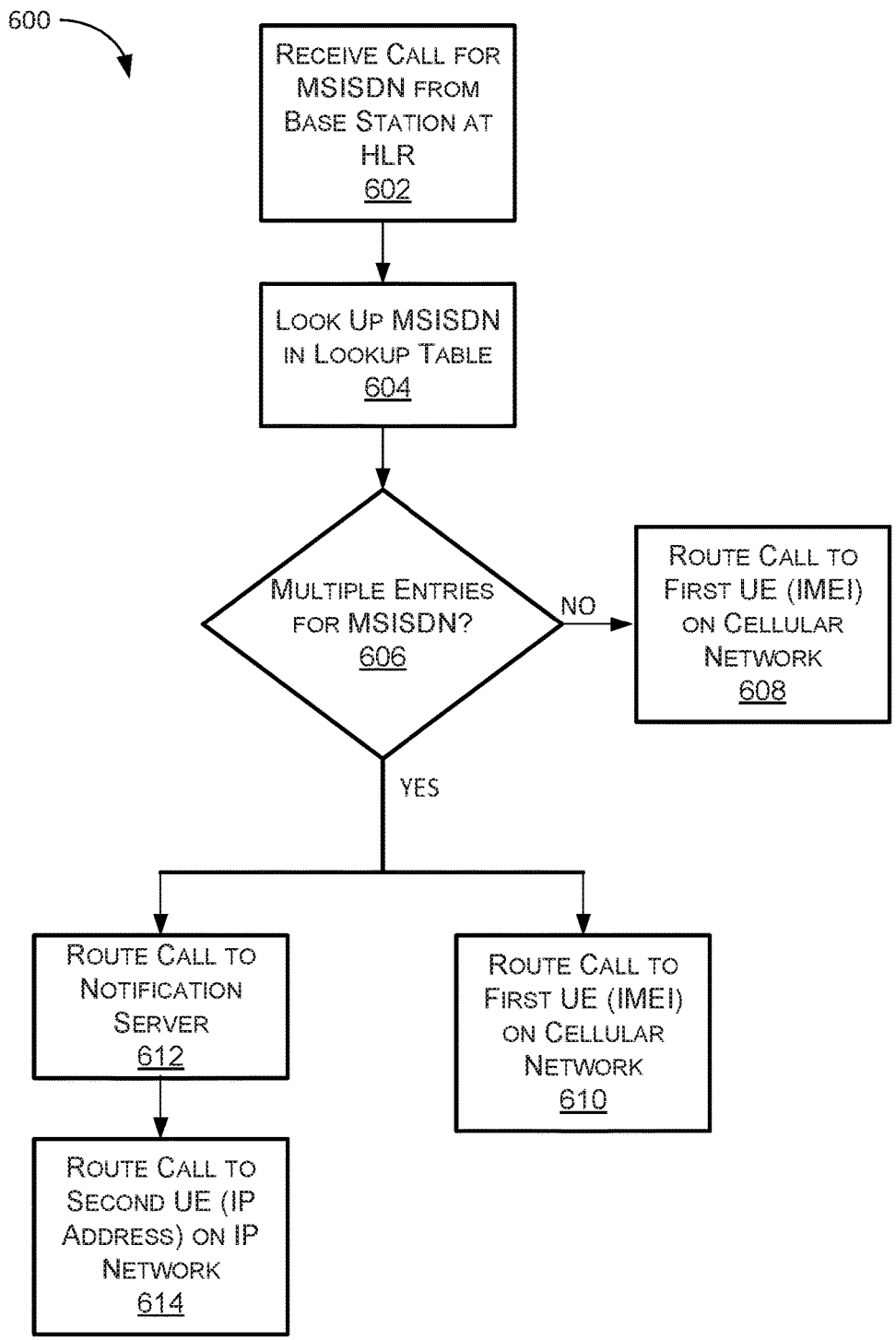
FIG. 6 is a flowchart that depicts an example method for receiving a call for an MSISDN, determining if the MSISDN is associated with multiple UEs, and routing the call appropriately, in accordance with some examples of the present disclosure.

As shown in FIG. 6, various network entities can provide the routing to cause a call placed to the work cell phone 106, for example, to ring on the personal cell phone 108 and tablet 110. In some embodiments, to receive the call, the personal cell phone 108 and tablet 110 may need to be running the application 103 and/or for the user to be logged in to receive the call. In other embodiments, however, running the application 103 on the target UE may not be necessary or that application 103 may be running in the background or in a "listening" mode. In some examples, the necessary entries in the HLR/HSS 116 lookup tables can be made according the method 400 discussed above.

At 602, the cellular network 114 can receive a call for the MSISDN associated with the work cell phone 106. The call can come from a cellular base station, for example, a PSTN, or an IP address, among other things.

At 604, regardless of the source of the call, the HLR/HSS 116 (or other network entity) can look up the MSISDN in the lookup table. At 606, in this case, unlike in a conventional system, however, the HLR/HSS 116 can determine if more than one entry is associated with the MSISDN. So, if the mobile number has not been added to the application 103, the entry may include only an IMEI for the work cell phone 106, and the call can be routed in the conventional manner.

If, on the other hand, the mobile number has been added to the application 103, the table may include one or more additional entries associated with the same MSISDN. Indeed, the user may have multiple UEs associated with the MSISDN, resulting in one entry in the routing table for each UE and the entry for the target device. In the example above, the HLR/HSS 116 may include an entry for the IMEI of the work cell phone 106 and an IP address for the personal cell phone 108 and the tablet 110.

At 608, if the lookup table includes only the standard, single entry (e.g., the IMEI of the work cell phone 106), the call can be routed through the cellular network 114 to the work cell phone 106 in the usual manner. In this configuration, only the work cell phone 106 rings as the IP addresses for the additional UEs 108, 110 have not been provided to the HLR/HSS 116.

If, on the other hand, the lookup table includes multiple entries, the HLR/HSS 116 can begin routing the call to each of the entries. At 610, as shown, one of the branches can be to route the call to the first UE (e.g., the work cell phone 106) in the conventional manner (discussed above). At 612, however, in this case, the HLR/HSS 116 can also route the call via the IP network 118 to the notification server 112. At 614, the notification server 112 can locate the mobile number in a lookup table, find the associated IP address, and then route the call to the second UE (e.g., the personal cell phone 108) via the IP network 118.

Of course, as mentioned above, in some examples, rather than routing the call to the notification server 112, the HLR/HSS 116 can route the call directly to the second UE. In this configuration, instead of including the IP address of the notification server 112, the lookup table can include the IP address of the second UE. The HLR/HSS 116 can then route the call to both the IMEI of the first UE and the IP address of the second UE at substantially the same time.

Figure 7:
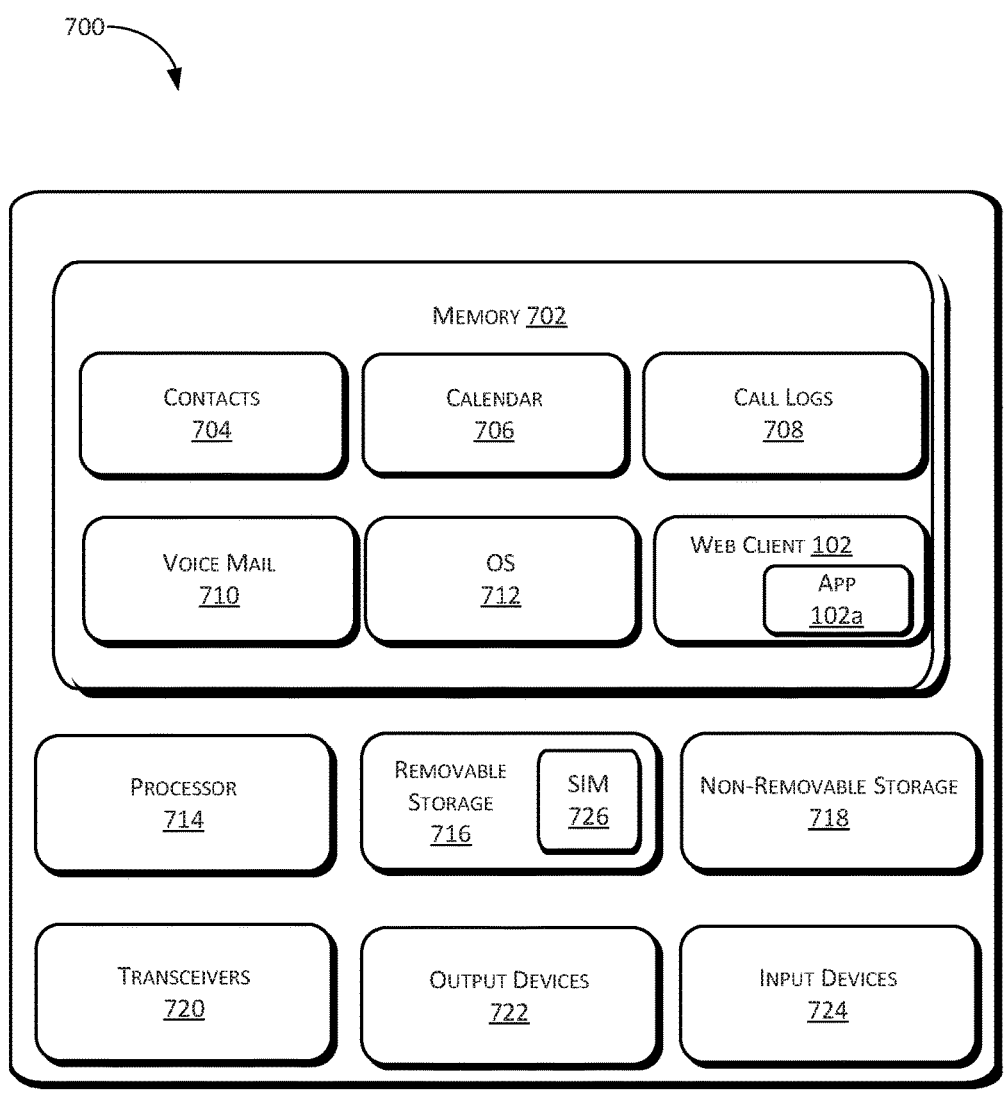
FIG. 7 is an example of a UE for use with the systems and methods disclosed herein, in accordance with some examples of the present disclosure.

FIG. 7 depicts a component level view of a UE for use with the systems 100, 200 and methods 300, 400, 500, 600 described herein. For clarity, the UE 700 is described herein generally as a cell phone or smart phone. One of skill in the art will recognize, however, that the systems 100, 200 and methods 300, 400, 500, 600 described herein can also be used with a variety of other electronic devices, such as, for example, traditional wireline phones, tablet computers, laptops, desktops, and other network (e.g., cellular or IP network) connected devices. These devices are referred to collectively below as UE 700.

The UE 700 can comprise a number of components to execute the above-mentioned functions. As discussed below, the UE 700 can comprise memory 702 including many common features such as, for example, the contacts 704, calendar 706, call logs 708, voicemail 710, and the operating system (OS) 712. In this case, the UE can also comprise the WebRTC client 102 and/or application 103. The UE 700 can also comprise one or more processors 714. The UE 700 can also include one or more of removable storage 716, non-removable storage 718, transceiver(s) 720, output device(s) 722, and input device(s) 724. In some examples, such as for cellular communication devices, the UE 700 can also include a SIM 726 including an international mobile subscriber identity (IMSI), and other relevant information.

In various implementations, the memory 702 can be volatile (such as random access memory (RAM)), non-volatile (such as read only memory (ROM), flash memory, etc.), or some combination of the two. The memory 702 can include all, or part, of the functions 704, 706, 708, 710, 102, 103 and the OS 712 for the UE 700, among other things.

The memory 702 can also comprise contacts 704, which can include names, numbers, addresses, and other information about the user's business and personal acquaintances, among other things. In some examples, the memory 702 can also include a calendar 706, or other software, to enable the user to track appointments and calls, schedule meetings, and provide similar functions. In some examples, the memory 702 can also include call logs 708 or recent, missed, and other calls received by the UE 700. The memory can also include voicemail 710, which can include an outgoing message and any saved voicemails, among other things. In some examples, rather than being stored in the memory 702, some or all of the functions and messages can be stored on a remote server or cloud of servers accessible by the UE 700.

In some examples, as discussed above, the contacts 704, calendar 706, call logs 708, and/or voicemail 710 can be accessible by, or provided to, the application 103. In other words, the application 103 can consolidate these functions 704, 706, 708, 710 for the UE 700 and other UE in a single GUI 200, for example, for use with the application 103. Thus, a user placing a call from the application 103 on the UE 700 (e.g., the work cell phone 106) can access the contacts from another UE (e.g., the personal cell phone 108). Similarly, the application 103 can display the calendar 706 from any of the UEs and/or combine the calendar 706 from all UEs into a single calendar with all calendar entries. Of course, the memory 702 can also include other software such as, for example, e-mail, text messaging, social media, and utilities (e.g., calculators, clocks, compasses, etc.). Some, or all, of which can be accessible by the application 103.

The memory 702 can also include the OS 712. Of course, the OS 712 varies depending on the manufacturer of the UE 700 and currently comprises, for example, iOS 10.3.2 for Apple products and Oreo for Android products. The OS 712 contains the modules and software that support a computer's basic functions, such as scheduling tasks, executing applications, and controlling peripherals. In some examples, the OS 712 can receive signals from the application 103, for example, to cause the UE 700 to ring, vibrate, store items in memory 702, etc. The OS 712 can also enable the WebRTC client 102 to send and retrieve data via an internet connection and perform other functions.

The UE 700 can also comprise one or more processors 714. In some implementations, the processor(s) 714 can be a central processing unit (CPU), a graphics processing unit (GPU), or both CPU and GPU, or any other sort of processing unit. The UE 700 may also include additional data storage devices (removable and/or non-removable) such as, for example, magnetic disks, optical disks, or tape. Such additional storage is illustrated in FIG. 7 by removable storage 716 and non-removable storage 718. The removable storage 716 and non-removable storage 718 can store some, or all, of the functions 704, 706, 708, 710, and/or OS 712.

Non-transitory computer-readable media may include volatile and nonvolatile, removable and non-removable tangible, physical media implemented in technology for storage of information, such as computer readable instructions, data structures, program modules, or other data. The memory 702, removable storage 716, and non-removable storage 718 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 700. Any such non-transitory computer-readable media may be part of the UE 700 or may be a separate database, databank, remote server, or cloud-based server.

In some implementations, the transceiver(s) 720 include any sort of transceivers known in the art. In some examples, the transceiver(s) 720 can include wireless modem(s) to facilitate wireless connectivity with the other UE, the Internet, and/or an intranet via the cellular network 114. Further, the transceiver(s) 720 may include a radio transceiver that performs the function of transmitting and receiving radio frequency communications via an antenna (e.g., Wi-Fi or Bluetooth®). In other examples, the transceiver(s) 720 may include wired communication components, such as a wired modem or Ethernet port, for communicating with the other UE or the provider's Internet-based network.

In this case, the transceiver(s) 720 can enable the UE 700 to connect to the IP network 118, for example, to receive calls and text messages when using the application 103. The transceiver(s) 720 can also include standard cellular transceivers to enable the UE 700 receive cellular calls directed to the mobile number associated with the UE 700. In this manner, the UE 700 can receive its own calls in the standard manner (e.g., via a cellular base station), for example, and calls for UEs associated with the application 103 via the Internet (e.g., via the WLAN 132).

In some implementations, the output device(s) 722 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 700 is receiving a call via the cellular network 114 (i.e., its "own" number) or via the IP network 118 (i.e., the number associated with another UE). The output device(s) 722 can also play different sounds depending on which number associated with application 103 is receiving an incoming call or text message. The output device(s) 722 can also play sounds and/or display messages in response to successful registrations with the notification server 112, HLR/HSS 116, or other network entities. Output device(s) 722 also include ports for one or more peripheral devices, such as headphones, peripheral speakers, or a peripheral display.

In various implementations, input device(s) 724 include any sort of input devices known in the art. For example, the input device(s) 724 may include a camera, a microphone, a keyboard/keypad, or a touch-sensitive display. A keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. In some examples, the UE 700 can include a touchscreen, for example, to enable the user to make selections (e.g., from the drop-down menus 236, 242) directly on the touchscreen.

Figure 8:
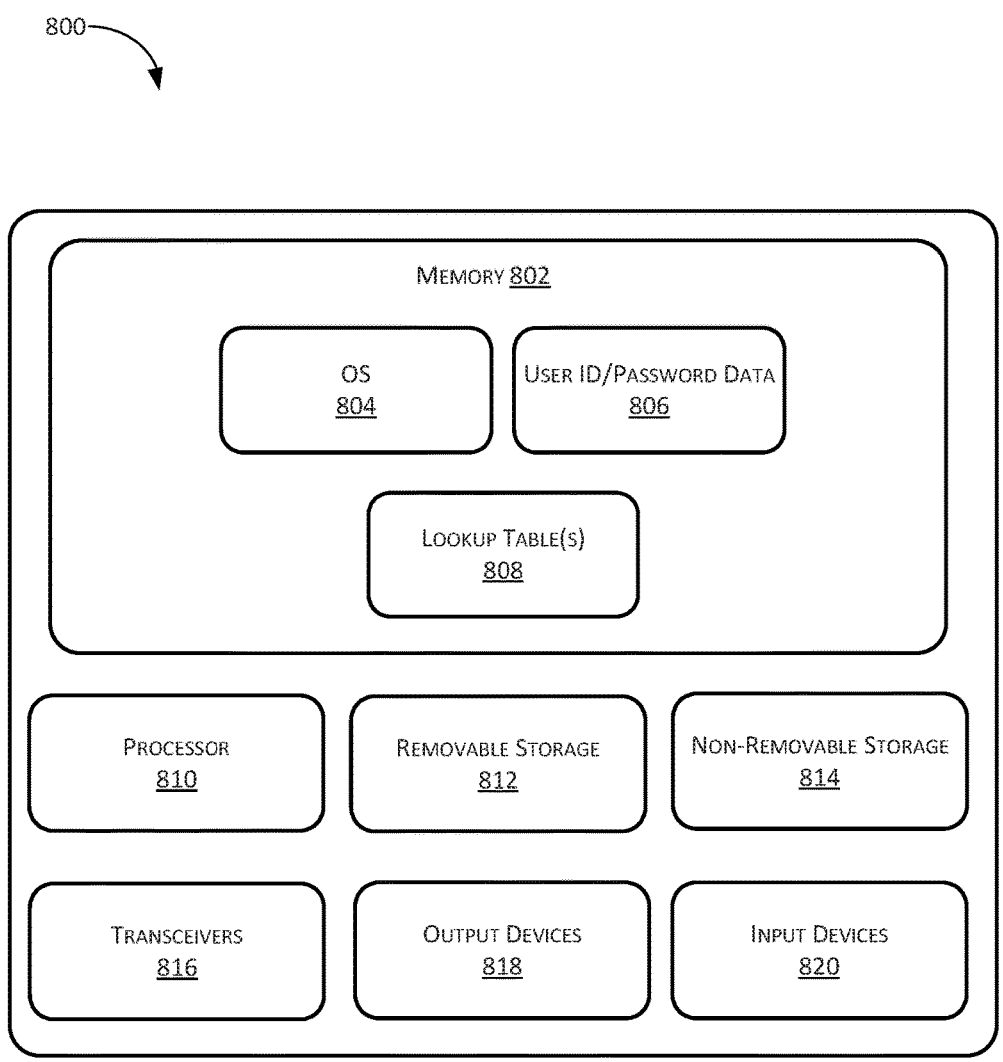
FIG. 8 is an example of a server for use with the systems and methods disclosed herein, in accordance with some examples of the present disclosure.

As shown in FIG. 8, the systems 100, 200 and methods 300, 400, 500, 600 can also be used in conjunction with a server 800. For clarity, the server 800 is described herein generally as a network entity such as, for example, the notification server 112. One of skill in the art will nonetheless recognize that the various components of the systems 100, 200 and methods 300, 400, 500, 600 described herein could be located in various other components of the cellular network or on a dedicated server. Thus, the server 800 is intended only to simplify the discussion and not to limit the disclosure. The server 800 can also comprise, for example, a network entity (e.g., a P-CSCF or PCRF), a dedicated server, desktop, laptop, tablet, or another type of computing device.

The server 800 can comprise a number of components to execute the above-mentioned functions and apps. As discussed below, the server 800 can comprise memory 802 including many common features such as, for example, the OS 804, the user ID/password data 806, and the lookup table(s) 808. Thus, the server 800 can verify users and mobile numbers, route calls from the cellular network 114 to the IP network 118 (and vice-versa) and perform other functions.

In various implementations, the memory 802 can be volatile (such as RAM), non-volatile (such as ROM, flash memory, etc.), or some combination of the two. The memory 802 can include all, or part, of the functions 806, 808 for the server 800, among other things. The memory 802 can also include the OS 804. Of course, the OS 804 varies depending on the manufacturer of the server 800 and the type of component. Many servers, for example, run Linux or Windows Server. Dedicated cellular routing servers may run specific telecommunications OSs 804. The OS 804 contains the modules and software that supports a computer's basic functions, such as scheduling tasks, executing applications, and controlling peripherals.

In this case, the server 800 can also include the user ID/password data 806. Thus, when a user attempts to use a mobile number via the application 103, for example, the server 800 can verify that the user ID and password match, that the user is authorized to use the requested mobile number, etc. The server 800 can also include one or more lookup table(s) 808. The lookup table(s) 808 can include, for example, IP addresses associated with their respective mobile numbers, mobile numbers associated with IMEIs, or other lookup tables to enable the server 800 to route calls to their respective UEs.

The server 800 can also comprise one or more processors 810. In some implementations, the processor(s) 810 can be a central processing unit (CPU), a graphics processing unit (GPU), or both CPU and GPU, or any other sort of processing unit. The server 800 can also include one or more of removable storage 812, non-removable storage 814, transceiver(s) 816, output device(s) 818, and input device(s) 820.

The server 800 may also include additional data storage devices (removable and/or non-removable) such as, for example, magnetic disks, optical disks, or tape. Such additional storage is illustrated in FIG. 8 by removable storage 812 and non-removable storage 814. The removable storage 812 and non-removable storage 814 can store some, or all, of the OS 804 and functions 806, 808.

Non-transitory computer-readable media may include volatile and nonvolatile, removable and non-removable tangible, physical media implemented in technology for storage of information, such as computer readable instructions, data structures, program modules, or other data. The memory 802, removable storage 812, and non-removable storage 814 are all examples of non-transitory computer-readable media.

Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 800. Any such non-transitory computer-readable media may be part of the server 800 or may be a separate database, databank, remote server, or cloud-based server.

In some implementations, the transceiver(s) 816 include any sort of transceivers known in the art. In some examples, the transceiver(s) 816 can include wireless modem(s) to facilitate wireless connectivity with the UE, the Internet, the cellular network 114, and/or an intranet via a cellular connection. Further, the transceiver(s) 816 may include a radio transceiver that performs the function of transmitting and receiving radio frequency communications via an antenna (e.g., Wi-Fi or Bluetooth®) to connect to the IP network 118. In other examples, the transceiver(s) 816 may include wired communication components, such as a wired modem or Ethernet port, for communicating with the UE, the HLR/HSS 116, or other entities in the cellular network 114 or IP network 118.

In some implementations, the output device(s) 818 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 800 is connected to a network, the type of call being received (e.g., cellular vs. IP calls), the number of active calls, etc. Output device(s) 818 also include ports for one or more peripheral devices, such as headphones, peripheral speakers, or a peripheral display.

In various implementations, input device(s) 820 include any sort of input devices known in the art. For example, the input device(s) 820 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular and IP communications, the systems and methods can be used with other types of wired and wireless communications. In addition, while various functions are discussed as being performed on the server 800 and/or by the UE 700, other components could perform the same or similar functions without departing from the spirit of the invention. In addition, while the disclosure is primarily directed to using mobile phone numbers to receive and place calls on the IP network 118, it can also be used on other similar networks that become available that have the same, or similar, types of addressing and routing.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a transceiver of a notification server associated with a network provider, a first request, from a communications application on a first user equipment (UE), requesting that an IP address of the first UE be associated with a second UE mobile station international subscriber directory number (MSISDN) of a second UE;
determining, with a processor of the notification server, that a user logged into the communications application is authorized to use the second UE MSISDN;
sending, with the transceiver of the notification server, a first request to a home location register/home subscriber server (HLR/HSS) to associate the IP address with the second UE MSISDN, wherein the second UE MSISDN is also associated with an international mobile equipment identity (IMEI) of the second UE in the HLR/HSS;
receiving, at the transceiver of the notification server, a second request, from the communications application, requesting that the IP address of the first UE be associated with a third UE MSISDN of a third UE;
determining, with the processor of the notification server, that the user logged into the communications application is not authorized to use the third UE MSISDN; and
sending, with the transceiver of the notification server, an error message to the communications application.

2. The method of claim 1, further comprising:
receiving, at the transceiver of the notification server, a third request, from the communications application, requesting that the IP address of the first UE be associated with a fourth UE MSISDN of a fourth UE;
determining, with the processor of the notification server, that the user logged into the communications application is authorized to use the fourth UE MSISDN;
sending, with the transceiver of the notification server, a third request to the home HLR/HSS to associate the IP address with the fourth UE MSISDN; and
wherein the fourth MSISDN is also associated with the IMEI of the second UE in the HLR/HSS.

3. The method of claim 1, wherein the first request includes a user ID and a password; and
wherein determining that the user logged into the communications application is authorized to use the second UE MSISDN includes determining that the user ID and password match.

4. The method of claim 3, wherein determining that the user logged into the communications application is authorized to use the second UE MSISDN further includes determining that the second UE MSISDN is associated with the user ID.

5. The method of claim 1, further comprising:
receiving, at the transceiver of the notification server, a call addressed to the second UE MSISDN;
locating, with the processor of the notification server, an IP address for the first UE that is associated with the second UE MSISDN; and
sending, with the transceiver of the notification server, the call to the IP address via an IP network.

* * * * *